United States Patent
Pisseloup et al.

(10) Patent No.: US 8,235,647 B2
(45) Date of Patent: Aug. 7, 2012

(54) BEARING-CHAMBER PRESSURE SYSTEM

(75) Inventors: Arnaud Pisseloup, Berlin (DE); Brian Giessel, Rehfelde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 910 days.

(21) Appl. No.: 12/314,329

(22) Filed: Dec. 8, 2008

(65) Prior Publication Data

US 2010/0143094 A1 Jun. 10, 2010

(30) Foreign Application Priority Data

Dec. 7, 2007 (DE) .......................... 10 2007 058 953

(51) Int. Cl.
*F01B 25/00* (2006.01)

(52) U.S. Cl. .................... 415/13; 60/39.08; 184/6.11

(58) Field of Classification Search .............. 415/13; 184/6.11; 60/39.08
See application file for complete search history.

(56) References Cited

U.S. PATENT DOCUMENTS

| | | | |
|---|---|---|---|
| 4,284,174 A | 8/1981 | Salvana et al. | |
| 4,433,539 A * | 2/1984 | Norris et al. | 60/39.08 |
| 4,441,311 A | 4/1984 | Rotondo et al. | |
| 4,497,172 A | 2/1985 | Smith | |
| 4,755,103 A | 7/1988 | Streifinger | |
| 2007/0157587 A1 * | 7/2007 | Broughton | 55/385.3 |
| 2007/0180830 A1 * | 8/2007 | Granitz et al. | 60/772 |
| 2007/0193276 A1 * | 8/2007 | Corattiyil et al. | 60/782 |

FOREIGN PATENT DOCUMENTS

| | | |
|---|---|---|
| DE | 3015650 | 11/1981 |
| DE | 2605619 | 8/1987 |
| DE | 3605619 | 8/1987 |
| DE | 102007022922 | 4/2009 |
| EP | 1316678 | 6/2003 |
| EP | 1820944 | 8/2007 |
| EP | 1847698 | 10/2007 |
| FR | 1429690 | 2/1966 |
| GB | 509238 | 7/1939 |
| JP | 62176599 | 11/1987 |

OTHER PUBLICATIONS

German Search Report dated Nov. 22, 2010 from counterpart application.
European Search Report dated Oct. 1, 2010 from counterpart application.
European Search Report dated Jun. 30, 2011 from counterpart application.

* cited by examiner

*Primary Examiner* — Ross Gushi

(74) *Attorney, Agent, or Firm* — Timothy J. Klima; Shuttleworth & Ingersoll, PLC

(57) ABSTRACT

A gas turbine has a rear bearing chamber 2 including a bearing arrangement 1. A vent valve 14 vents the bearing chamber 2 as a function of relative pressure of the bearing chamber.

19 Claims, 2 Drawing Sheets

BEARING-CHAMBER PRESSURE SYSTEM

Figure 1:
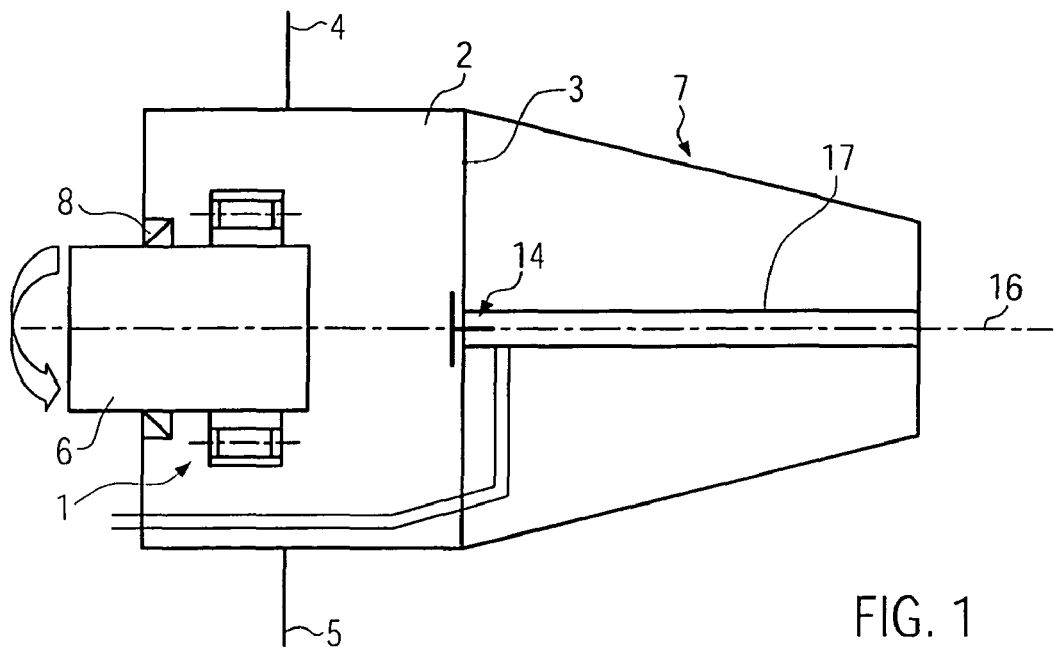

This application claims priority to German Patent Application DE 10 2007 058 953.2 filed Dec. 7, 2008, the entirety of which is incorporated by reference herein.

The present invention relates to a gas-turbine bearing chamber with a bearing-chamber pressure system.

From the state of the art it is known that the casing (the bearing chamber) of the bearing located rearward in the axial direction (flow direction) is provided with an air seal on its front side only and that it is not specially vented. The system relies on the capacity of the scavenge pump which, accordingly, is used for both oil scavenging and venting.

The internal pressure of a bearing chamber results from the pressure of the seal air minus a pressure loss across the seal. The pressures (seal air and internal pressure) change permanently during the operation of the gas turbine. When the speed of the gas turbine is reduced, for example during a descent from a higher flight altitude with an idle speed being set, and, even more, when the gas turbine is shut down, pressure reversal across the seal occurs resulting in oil exiting from the bearing chamber which is perceptible at the rear of the engine as oil smoke or momentary oil combustion. This flow reversal is caused by the immediate drop of the seal air pressure delivered by the high-pressure compressor. However, if the bearing chamber is sealed with narrow bearing gaps, for example in the case of a carbon seal, the internal pressure of the bearing chamber results from the underpressure delivered by the scavenge pump which drops less rapidly than the seal air pressure. Therefore, situations occur in which the pressure in the bearing chamber can be higher than the seal air pressure. If the seal is incapable of withstanding a minimum of negative pressure profile, the situation occurs that the reversed flow direction causes oil to exit from the bearing chamber through the seal.

The state of the art, therefore, provides for enhanced oil scavenging, for example larger oil scavenge pumps and improved oil collection devices. It is further attempted to reduce the seal air pressure to bring the bearing chamber pressure to a lower level. This also reduces the likelihood of a pressure reversal across the seal during speed reduction or shutdown of the gas turbine.

In the state of the art, seals with higher capacity are known which are capable of withstanding negative pressure (pressure reversal).

A broad aspect of this invention is to provide a bearing-chamber arrangement which, while being simply designed and simply and reliably operating, avoids the disadvantages of the state of the art and prevents oil from exiting due to flow reversal across the seal.

The present invention relates in particular to bearing chambers which are located rearward in the flow direction, are not vented and have only one seal. The object of the present invention is to provide a system which enables rapid pressure compensation of the rear bearing chambers, in particular when the speed of the gas turbine is reduced or the gas turbine is shut down. Accordingly, the internal pressure of the bearing chamber decreases to a value which is as close as possible to, or even below, the seal air pressure, so that no or only minimum flow reversal occurs, with the seal being capable of withstanding this situation, and no oil exiting from the bearing chamber.

The basic principle of the present invention is to provide an additional vent valve in the bearing chamber. This vent valve can preferably be connected to a vent line. In a preferred development of the present invention, the valve can also be connected to an oil separator, or venting can be accomplished through the vent valve into a bypass duct. In a further variant according to the present invention, venting is accomplished into a cavity in an exhaust cone which is connectable to the environment via a second vent valve.

The vent valve according to the present invention can be a simple pressure-limiting valve set such that it will open when the difference between the pressure in the bearing chamber and the seal air pressure exceeds a minimum value which corresponds with a speed reduction phase or a shutdown of the gas turbine.

The vent valve can also be provided such that it is set to the same differential pressure, but is actuated by the system with the higher pressure, i.e. by either the seal air pressure during normal operation of the gas turbine (with the exception of a state of speed reduction) or the bearing chamber pressure during speed reduction or shutdown of the gas turbine.

Due to the low pressure in the bearing chamber upon shutdown of the gas turbine (slightly above the ambient pressure), it can be difficult to produce an airflow through a vent line to the oil separator or a bypass duct or directly into the exhaust gas (at the end of the exhaust cone). The flow would have to overcome the pressure loss through the vent valve, the vent lines and the oil separator when the connection to the oil separator or the bypass duct is made. Such a vent line might possibly require an ejector. For this reason, it may be particularly advantageous in certain applications to vent the bearing chamber directly into the bypass duct or rearwards into the exhaust cone. Owing to the pressure difference of the airflow, this can prove to be highly effective.

Figure 2:
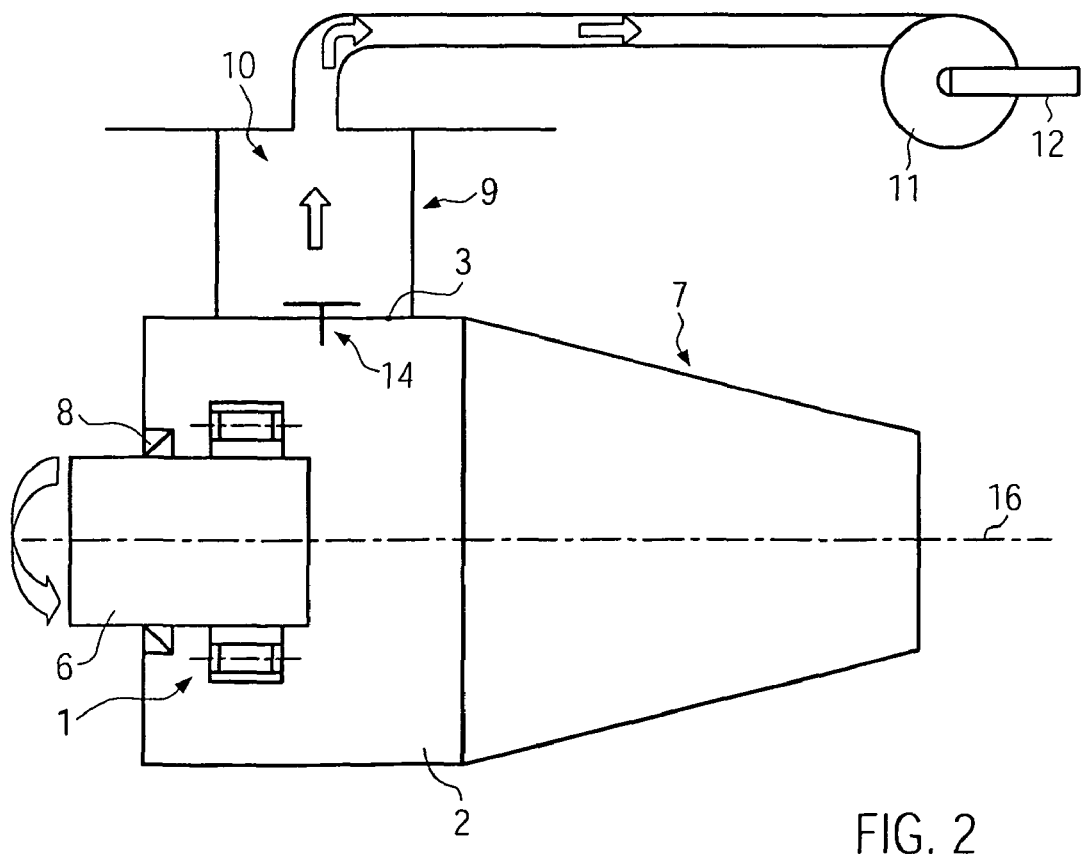
Figure 3:
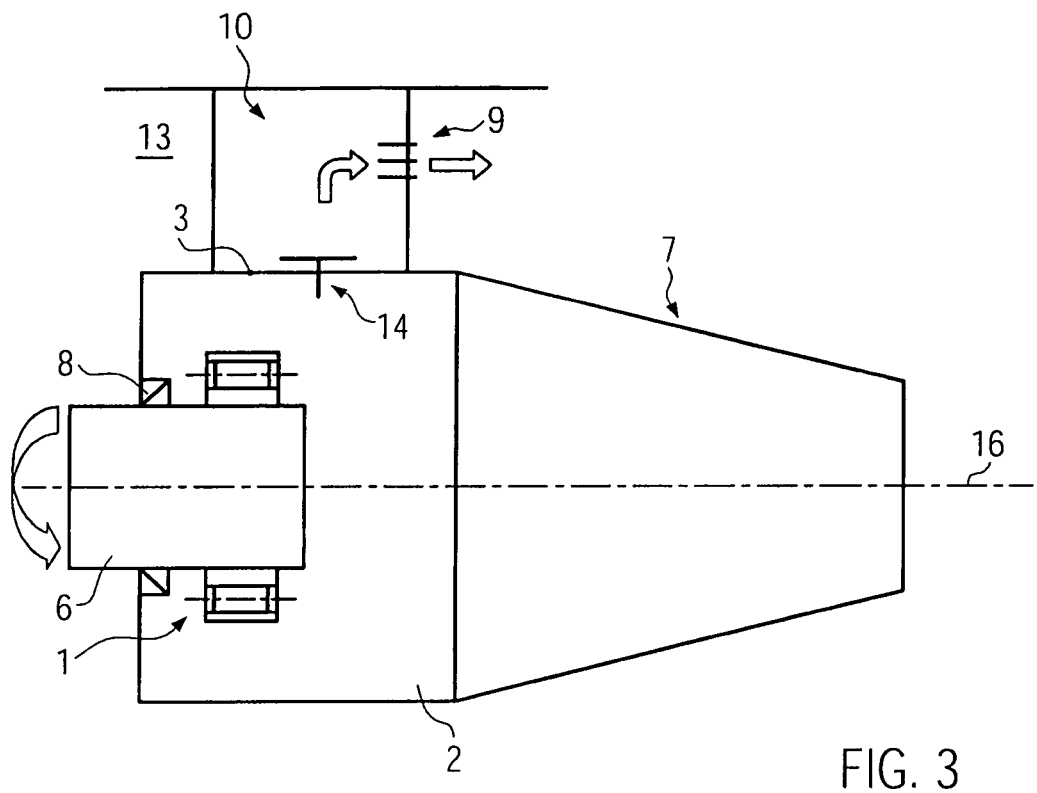
Figure 4:
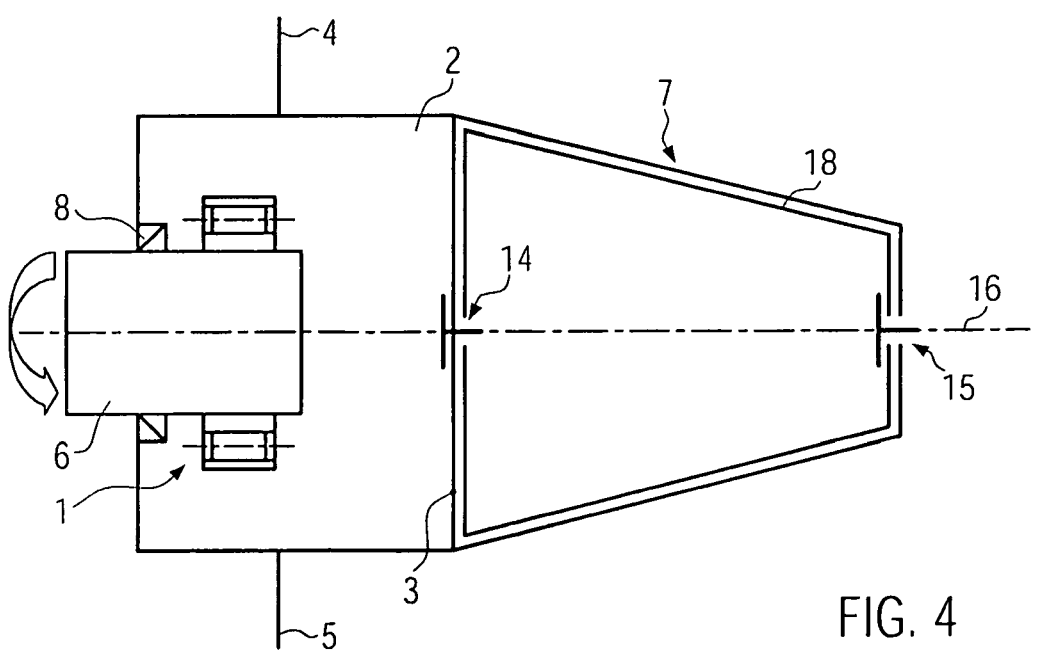

In the following the present invention is more fully described in light of the accompanying drawings showing preferred embodiments. In the drawings, FIG. 1 is a simplified representation of the rearward bearing chambers with venting being accomplished through an exhaust cone, FIG. 2 shows an embodiment with venting being accomplished through an oil separator, FIG. 3 shows an embodiment with venting being accomplished into a bypass duct, FIG. 4 shows an embodiment with venting being accomplished into an exhaust cone.

In the embodiments shown, identical parts carry the same reference numerals.

FIG. 1 shows a bearing arrangement 1 located in a rear bearing chamber 2. The bearing chamber 2 includes a wall 3. In FIGS. 1 and 4, an oil supply line 4 and an oil scavenge line 5 are shown. A rotating shaft is indicated by the reference numeral 6. Adjoining the bearing chamber 2 is an exhaust cone 7. Reference numeral 8 indicates an air seal. In this respect, the design corresponds to the state of the art so that a detailed further description can be dispensed with.

FIG. 1 shows an embodiment in which venting is accomplished through the rearward exhaust cone 7. In this embodiment, a vent valve 14 arranged on a wall adjacent to the exhaust cone 7, preferably on or above the center line of the rotational axis, is used to limit the oil leakage quantity in the static state of the gas turbine. The vent valve 14 vents through a vent tube 17 which extends centrally through the exhaust cone to the environment.

FIGS. 2 and 3 show other embodiments in which the vent valve 14 is vented through the rear supporting strut 10. For safety reasons, the supporting strut 10 should be provided with a double wall. Venting is then accomplished (FIG. 2) via a line to an oil separator 11 and its vent 12. In the embodiment of FIG. 3, venting is accomplished via an ejector system 9 from the rear supporting strut 10 into a bypass duct 13.

FIG. 4 shows a further embodiment in which a cavity in the exhaust cone 7 is used. Venting into the inner chamber 18 of the exhaust cone 7 is effected by the vent valve 14. For venting to the environment, a second vent valve 15 is provided. The underlying principle of this embodiment is to produce a pressure drop into the inner chamber 18 so that, when the pressure in the bearing chamber exceeds the seal air pressure, the vent valve 14 at the interface between the bearing chamber 2 and the inner chamber 18 will open, thereby causing the pressure to decay from the bearing chamber to the inner chamber 18. This requires that the pressure in the inner chamber 18 is lower than the pressure in the bearing chamber 2. To this effect, a second vent valve 15 is provided at the other end of the exhaust cone 7 so that the inner chamber 18 is vented at high altitudes at which the pressure is lower than during a speed reduction of the gas turbine in descent or upon shutdown of the gas turbine in normal operation on the ground. Alternatively, another vacuum source (relative to the bearing chamber) can also be used. This solution must be based on a logic circuit (closed-loop or open-loop control) for opening and closing the vent valves 14 and 15. The circuit can be provided as part of a controller for the gas turbine or aircraft, or can be provided in a separate controller that either operates independently or in conjunction with other controllers. The circuit can here operate according to the following provision:

| Operating condition | Vent valve 14 | Vent valve 15 |
| --- | --- | --- |
| Taxiing of aircraft | closed | closed |
| Take-off (MTO) | closed | closed |
| Climb (MCL) | closed | closed |
| Cruise (MCR) | closed | open |
| Starting descent | open | closed |
| Descent | closed | open |
| Approach and landing | closed | closed |
| Thrust reversal | closed | closed |
| Taxiing of aircraft | closed | closed |
| Shutdown | open | closed |

To avoid flow reversal across the seal of the bearing arrangement, it is particularly favorable in accordance with the present invention if the response time of the vent valve 14 is shorter than the time required for speed reduction of the high-pressure compressor of the gas turbine.

Aspects of the various embodiments can be combined in different manners to create different embodiments within the scope of the present invention.

Therefore, according to the prevent invention, oil leakage is avoided which might occur due to flow reversal across the seal when the speed of the gas turbine is reduced or the gas turbine is shut down. Furthermore, it is particularly advantageous that venting via the oil separator or the bypass duct or the rear of the exhaust cone prevents oil traces from occurring on the outer area of the bearing chamber or the engine cowling. The present invention accordingly provides for an improved oil scavenge system and lower oil loss, resulting in reduced oil consumption.

| List of reference numerals | |
| --- | --- |
| 1 | Bearing arrangement |
| 2 | Bearing chamber (rear) |
| 3 | Wall |
| 4 | Oil supply line |
| 5 | Oil scavenge line |
| 6 | Shaft |
| 7 | Exhaust cone |
| 8 | Air seal |
| 9 | Ejector system |
| 10 | Rear supporting strut |
| 11 | Oil separator |
| 12 | Vent of oil separator |
| 13 | Bypass duct |
| 14 | Vent valve |
| 15 | Second vent valve |
| 16 | Center line/rotational axis |
| 17 | Vent tube |
| 18 | Inner chamber |

What is claimed is:

1. A gas turbine, comprising:
a rear bearing chamber;
a first vent valve operably connected to the rear bearing chamber, the first vent valve constructed and arranged to allow venting of the rear bearing chamber as a function of a relative pressure of the rear bearing chamber;
wherein the venting is accomplished into a bypass duct of the gas turbine.

2. The gas turbine of claim 1, and further comprising a vent line into which venting is accomplished.

3. The gas turbine of claim 1, and further comprising an oil separator into which venting is accomplished.

4. The gas turbine of claim 1, wherein the first vent valve is a pressure-limiting valve.

5. The gas turbine of claim 1, wherein the first vent valve is a controllable valve.

6. The gas turbine of claim 5, and further comprising a controller for controlling the first vent valve.

7. The gas turbine of claim 1, wherein the first vent valve is constructed and arranged to have a response time that is shorter than a time required for speed reduction of a high-pressure compressor of the gas turbine, when a speed of the gas turbine is reduced or the gas turbine is shut down.

8. The gas turbine of claim 1, wherein the venting is accomplished into the bypass duct through a supporting strut for the gas turbine.

9. The gas turbine of claim 1, wherein the first vent valve is positioned in a wall of the bearing chamber.

10. A gas turbine, comprising:
a rear bearing chamber;
a first vent valve operably connected to the rear bearing chamber, the first vent valve constructed and arranged to allow venting of the rear bearing chamber as a function of a relative pressure of the rear bearing chamber;
wherein the venting is accomplished into an exhaust cone of the gas turbine.

11. A gas turbine, comprising:
a rear bearing chamber;
a first vent valve operably connected to the rear bearing chamber, the first vent valve constructed and arranged to allow venting of the rear bearing chamber as a function of a relative pressure of the rear bearing chamber;
a vent line into which venting is accomplished;
a second vent valve positioned between the vent line and a relative vacuum source, with the vent line positioned between the first vent valve and the second vent valve, the second vent valve operable to vent the vent line to the relative vacuum source and create a relative vacuum in the vent line into which the first vent valve can vent the rear bearing chamber.

12. The gas turbine of claim 11, wherein the relative vacuum source is the atmosphere at elevated altitudes and the first and second vent valves are controlled according to the following control chart:

| Operating condition | First vent valve | Second vent valve |
|---|---|---|
| Taxiing of aircraft | closed | closed |
| Take-off (MTO) | closed | closed |
| Climb (MCL) | closed | closed |
| Cruise (MCR) | closed | open |
| Starting descent | open | closed |
| Descent | closed | open |
| Approach and landing | closed | closed |
| Thrust reversal | closed | closed |
| Taxiing of aircraft | closed | closed |
| Shutdown | open | closed. |

13. The gas turbine of claim 12, wherein the vent line passes through an exhaust cone of the gas turbine.

14. The gas turbine of claim 13, wherein the vent line is formed by an inner chamber of the exhaust cone and the first vent valve is positioned between the rear bearing chamber and the inner chamber and the second vent valve is positioned between the inner chamber and the atmosphere.

15. The gas turbine of claim 14, and further comprising a controller for controlling at least one of the first and second vent valves.

16. The gas turbine of claim 13, wherein the vent line is formed by an inner chamber of the exhaust cone and the first vent valve is positioned between the rear bearing chamber and the inner chamber and the second vent valve is positioned between the inner chamber and the relative vacuum source.

17. The gas turbine of claim 16, and further comprising a controller for controlling at least one of the first and second vent valves.

18. The gas turbine of claim 11, wherein the vent line passes through an exhaust cone of the gas turbine.

19. A gas turbine, comprising:
a rear bearing chamber;
a first vent valve operably connected to the rear bearing chamber, the first vent valve constructed and arranged to allow venting of the rear bearing chamber as a function of a relative pressure of the rear bearing chamber;
a vent line into which venting is accomplished;
wherein the vent line passes through a supporting strut for the gas turbine.

* * * * *